US008113426B2

(12) United States Patent
Kallin et al.

(10) Patent No.: US 8,113,426 B2

(45) Date of Patent: Feb. 14, 2012

(54) CHECK PROCESSING MODULE FOR A SELF-SERVICE CHECK DEPOSITING TERMINAL

(75) Inventors: Fredrik L. N. Kallin, Waterloo (CA); Frank B. Dunn, Waterloo (CA); Robert J. Ross, Waterloo (CA); Owen H. Wilson, Kitchener (CA)

(73) Assignee: NCR Corporation, Duluth, GA (US)

( * ) Notice: Subject to any disclaimer, the term of this patent is extended or adjusted under 35 U.S.C. 154(b) by 943 days.

(21) Appl. No.: 12/152,776

(22) Filed: May 16, 2008

(65) Prior Publication Data

US 2009/0283383 A1 Nov. 19, 2009

(51) Int. Cl.
*G06K 7/00* (2006.01)

(52) U.S. Cl. ........................................ 235/439; 235/449

(58) Field of Classification Search .................. 271/110; 375/340; 384/295–298; 194/344–346; 464/180–181

See application file for complete search history.

(56) References Cited

U.S. PATENT DOCUMENTS

2006/0285613 A1* 12/2006 Graef et al. .................. 375/340

* cited by examiner

*Primary Examiner* — Thien M. Le
*Assistant Examiner* — Christle Marshall
(74) *Attorney, Agent, or Firm* — MIchael Chan

(57) ABSTRACT

A check processing module (CPM) is provided for a self-service check depositing terminal. The CPM comprises a substantially U-shaped plastic guide including (i) first and second leg portions forming the substantially U-shape, (ii) a surface which forms an opening in the first leg portion, and (ii) a releasing member which is disposed on the second leg portion. The CPM further comprises a shaft assembly including (i) a plastic shaft having opposite end portions and a central portion between the opposite end portions, (ii) a number of drive rollers disposed on the central portion, (iii) a first plastic race bearing attached to one end portion of the plastic shaft and disposed in the opening of the plastic guide, and (iv) a second plastic race bearing attached to the other end portion of the plastic shaft and secured by the releasing member to the plastic guide. The releasing member is operable to secure the shaft assembly to the plastic guide during operation of the CPM, and is operable to release the shaft assembly from the plastic guide during disassembly of parts of the CPM.

12 Claims, 9 Drawing Sheets

CHECK PROCESSING MODULE FOR A SELF-SERVICE CHECK DEPOSITING TERMINAL

BACKGROUND

The present invention relates to self-service check depositing terminals, and is particularly directed to a check processing module for a self-service check depositing terminal, such as a check depositing automated teller machine (ATM).

In a typical check depositing ATM, an ATM customer is allowed to deposit a check (without having to place the check in any deposit envelope) in a publicly accessible, unattended environment. To deposit a check, the ATM customer inserts a user identification card through a user card slot at the ATM, enters the amount of the check being deposited, and inserts the check to be deposited through a check slot of a check acceptor. A check transport mechanism receives the inserted check and transports the check in a forward direction along a check transport path to a number of locations within the ATM to process the check.

If the check is not accepted for deposit, the check transport mechanism transports the check in a reverse direction along the check transport path to return the check to the ATM customer via the check slot. If the check is accepted for deposit, the amount of the check is deposited into the ATM customer's account and the check is transported to a storage bin within the ATM. An endorser printer prints an endorsement onto the check as the check is being transported to and stored in the storage bin. Checks in the storage bin within the ATM are periodically picked up and physically transported via courier to a back office facility of a financial institution for further processing.

In some known check depositing ATMs, certain components are housed in modular units which, in turn, are housed in a larger module. The larger module is sometimes referred to as a "check processing module" (CPM). Such modules are included in ATMs provided by NCR Corporation, located in Dayton, Ohio. One example is Model No. CPM2 in which a modular unit called a "pocket module" is located in approximately the central portion of the CPM. Another example is Model No. CPM3 in which the pocket module is located in approximately the bottom portion of the CPM. Still another example is Model No. CPM4 in which the pocket module is located in approximately the top portion of the CPM.

Known CPMs are typically constructed with a pair of sheet metal side plates which provide mounting surfaces for flanged steel ball bearings which, in turn, support steel drive shafts with rubber drive rollers. A drawback in these known CPMs is that steel ball bearings and steel drive shafts are relatively expensive. Moreover, assembly of a CPM is relatively time consuming as C-clips and wavy washers are typically used to maintain the steel ball bearings against the sheet metal side plates. Also, disassembly of a CPM is relatively time consuming when a component that is trapped between the sheet metal side plates needs to be replaced. It would be desirable to provide a CPM which is relatively low cost, relatively easy to assemble, and relatively easy to disassemble whenever disassembly is required.

SUMMARY

In accordance with an embodiment of the present invention, a check processing module (CPM) is provided for a self-service check depositing terminal. The CPM comprises a substantially U-shaped plastic guide including (i) first and second leg portions forming the substantially U-shape, (ii) a surface which forms an opening in the first leg portion, and (ii) a releasing member which is disposed on the second leg portion. The CPM further comprises a shaft assembly including (i) a plastic shaft having opposite end portions and a central portion between the opposite end portions, (ii) a number of drive rollers disposed on the central portion, (iii) a first plastic race bearing attached to one end portion of the plastic shaft and disposed in the opening of the plastic guide, and (iv) a second plastic race bearing attached to the other end portion of the plastic shaft and secured by the releasing member to the plastic guide. The releasing member is operable to secure the shaft assembly to the plastic guide during operation of the CPM, and is operable to release the shaft assembly from the plastic guide during disassembly of parts of the CPM.

DETAILED DESCRIPTION

The present invention is directed to a check processing module for a self-service terminal, such as a check depositing automated teller machine (ATM).

Figure 1:
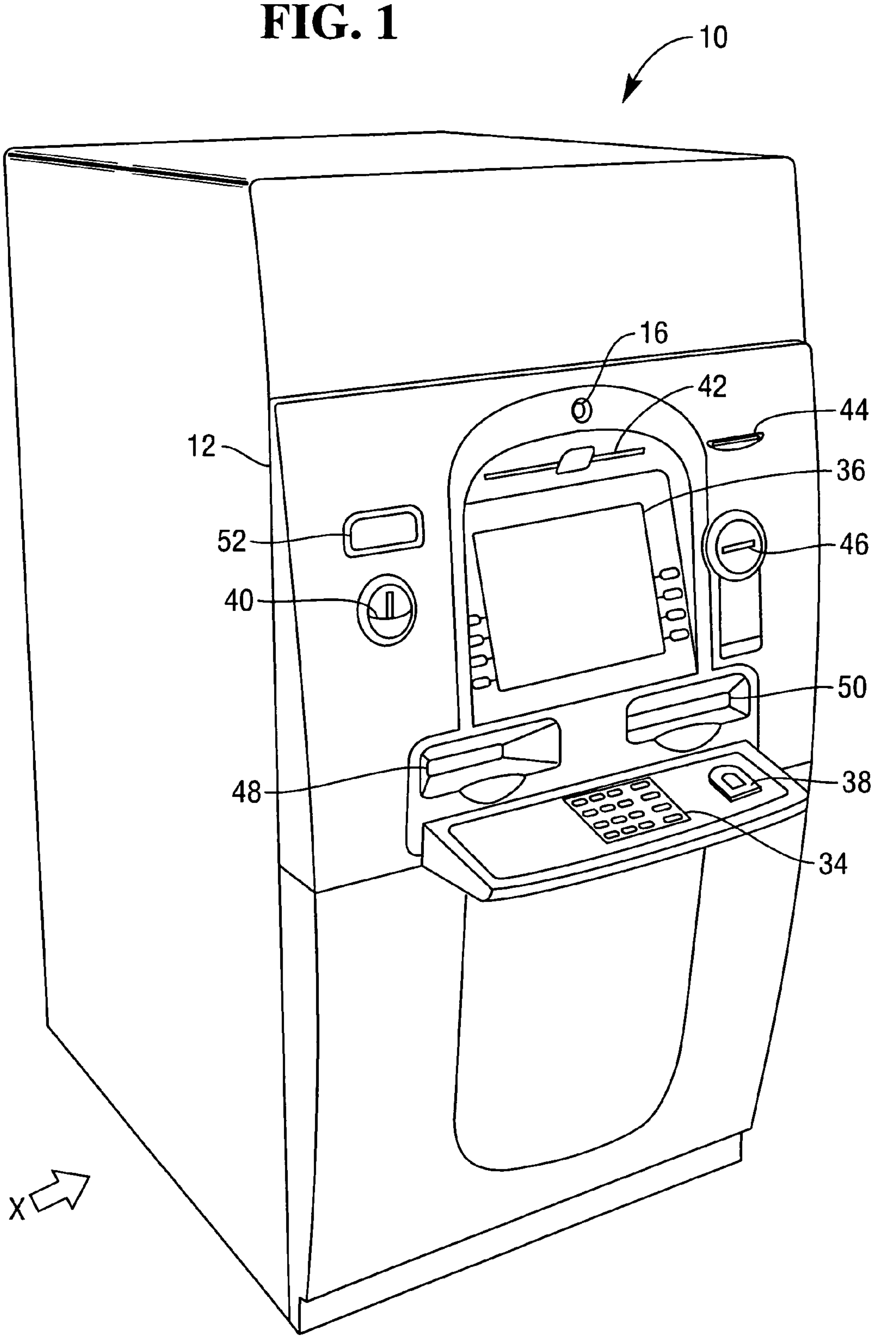
FIG. 1 is a left-front perspective view of one type of check depositing automated teller machine (ATM) embodying the present invention.

Referring to FIG. 1, a self-service check depositing terminal in the form of an image-based check depositing automated teller machine (ATM) 10 is illustrated. The check depositing ATM 10 comprises a fascia 12 coupled to a chassis (not shown). The fascia 12 defines an aperture 16 through which a camera (not shown) images a customer of the ATM 10. The fascia 12 also defines a number of slots for receiving and dispensing media items, and a tray 40 into which coins can be dispensed. The slots include a statement output slot 42, a receipt slot 44, a card reader slot 46, a cash slot 48, another cash slot 50, and a check input/output slot 52. The slots 42 to 52 and tray 40 are arranged such that the slots and tray align with corresponding ATM modules mounted within the chassis of the ATM 10.

The fascia 12 provides a user interface for allowing an ATM customer to execute a transaction. The fascia 12 includes an encrypting keyboard 34 for allowing an ATM customer to enter transaction details. A display 36 is provided for presenting screens to an ATM customer. A fingerprint reader 38 is provided for reading a fingerprint of an ATM customer to identify the ATM customer. The user interface features described above are all provided on an NCR PERSONAS (trademark) 6676 ATM, available from NCR Financial Solutions Group Limited, Discovery Centre, 3 Fulton Road, Dundee, DD2 4SW, Scotland.

Figure 2:
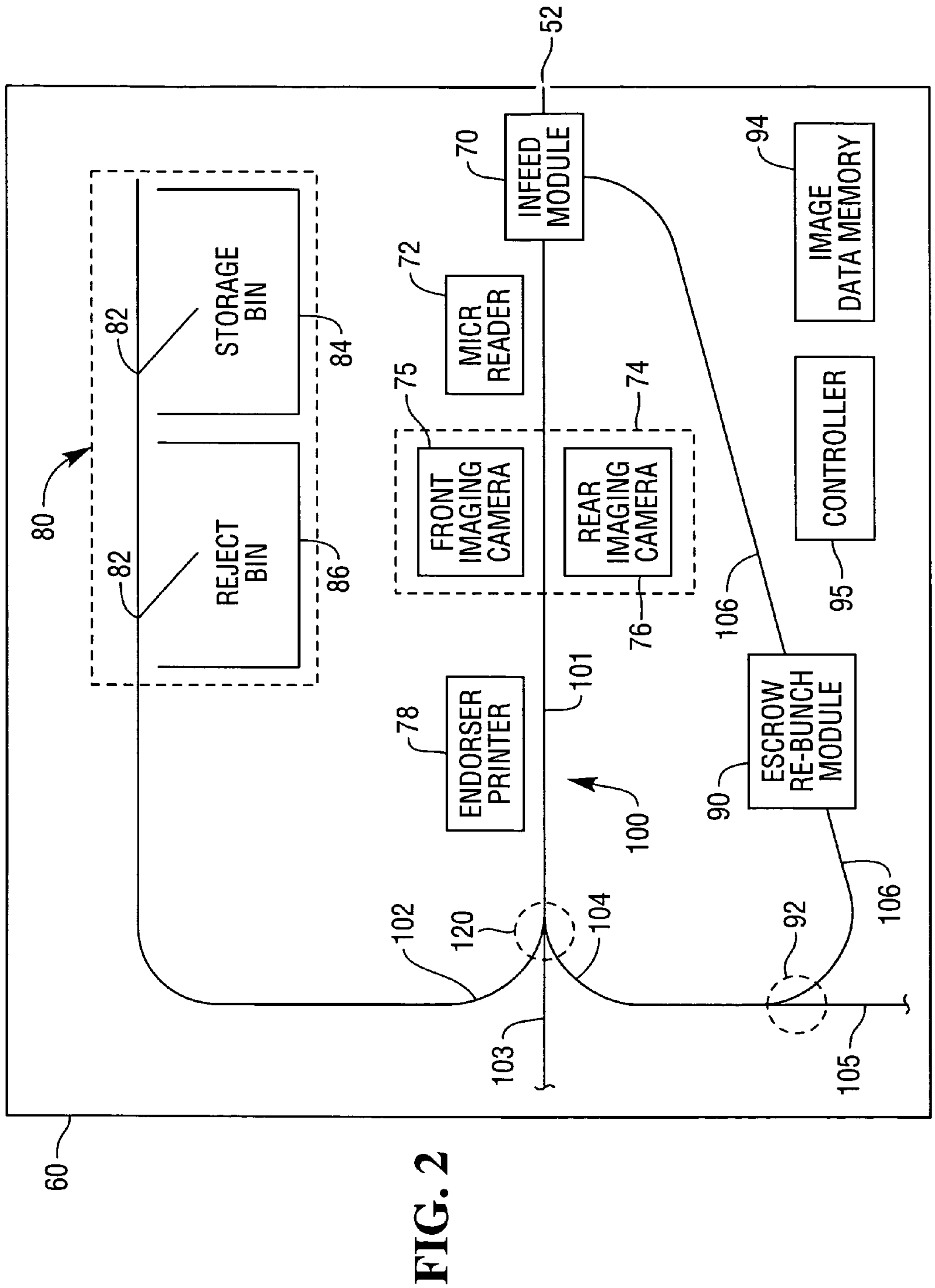
FIG. 2 is a simplified schematic diagram, looking approximately in the direction of arrow X in FIG. 1, and illustrating a check processing module (CPM) configured to operate in the ATM of FIG. 1.
Figure 5:
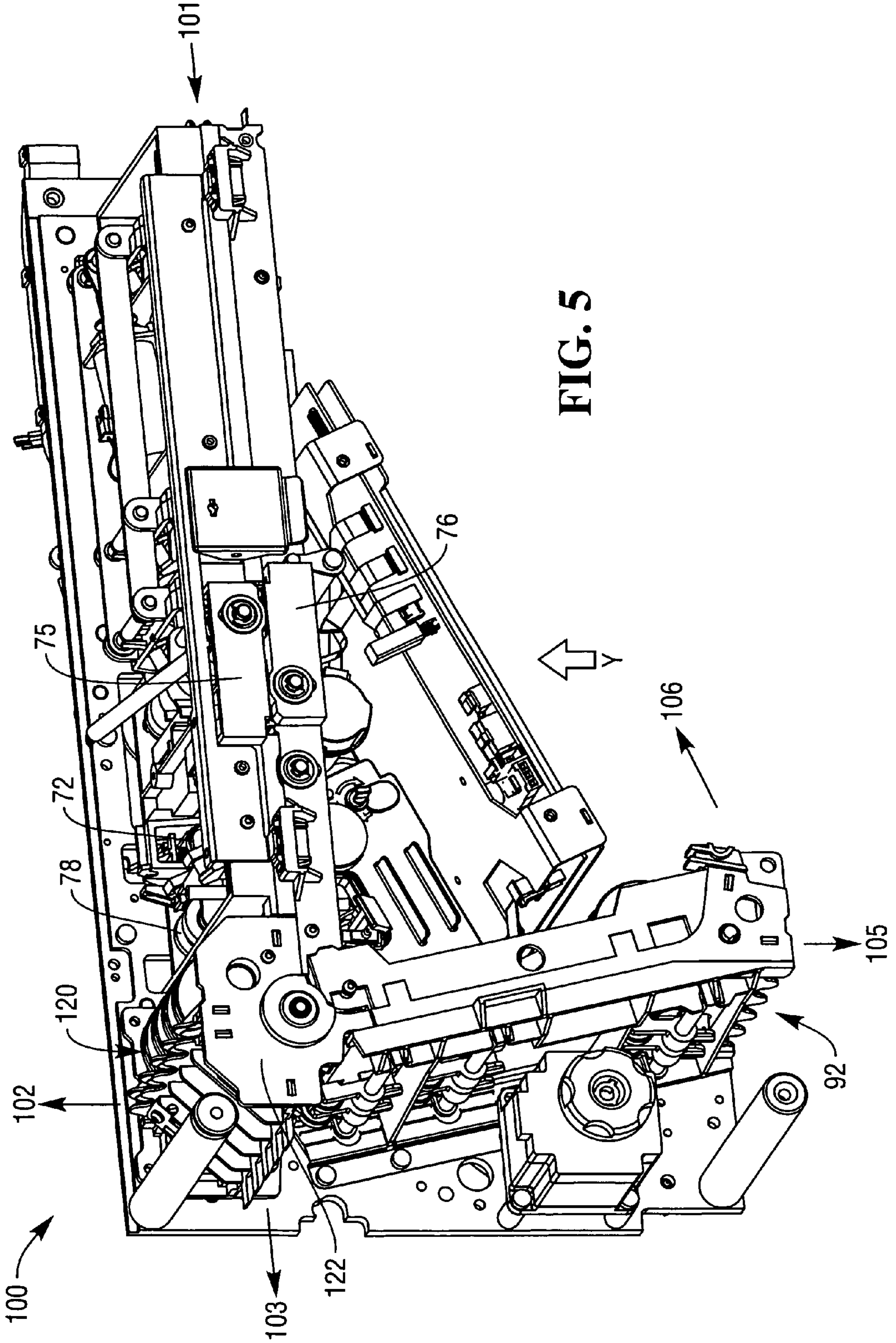
FIG. 5 is a pictorial view of a transport module of the CPM of FIG. 2.

Referring to FIG. 2, a first configuration of a check processing module (CPM) 60 is illustrated. The CPM 60 will now be described with reference to FIGS. 2 and 5. FIG. 2 is a simplified schematic diagram (looking approximately in the direction of arrow X in FIG. 1) of part of the fascia 12 and main parts of the CPM 60. FIG. 5 is a pictorial view of a part (to be described later) used in the CPM 60 shown in FIG. 2.

The CPM 60 of FIG. 2 comprises four main units which include an infeed module 70, a pocket module 80, an escrow re-bunch module (ERBM) 90, and a transport module 100. The infeed module 70 receives a check which has been deposited into the check input/output slot 52 (FIG. 1), and transports the check to an inlet of the transport module 100. The dimensions of the infeed module 70, such as its run length, may vary depending upon the particular model ATM the CPM 60 is installed. The structure and operation of the infeed module 70 are conventional and well known and, therefore, will not be described.

The transport module 100 includes a check input/output transport mechanism which receives a check from the inlet adjacent to the infeed module 70, and transports the check along a first document track portion 101 which is the main track portion. The transport module 100 includes a first document diverter 120 which is operable to divert a check along a second document track portion 102 to the pocket module 80, a third document track portion 103 (not used in the configuration shown in FIG. 2), or a fourth document track portion 104 which leads to the ERBM 90.

The structure and operation of the first diverter 120 shown in FIG. 2 may be any suitable diverter which is capable of diverting a check along one of three different document transport paths. An example of a suitable three-way diverter is disclosed in U.S. patent application Ser. No. 12/004,354, filed on Dec. 20, 2007, entitled "Document Diverter Apparatus for Use in a Check Processing Module of a Self-Service Check Depositing Terminal", and assigned to NCR Corporation located in Dayton, Ohio. The disclosure of U.S. patent application Ser. No. 12/004,354 is hereby incorporated by reference.

A second document diverter 92 is operable to divert a check along a fifth document track portion 105 (not used in the configuration shown in FIG. 2), or a sixth document track portion 106 which leads to the ERBM 90 and then back to the infeed module 70. More specifically, the sixth document track 106 interconnecting the ERBM 90 and the infeed module 70 allows a bunch of checks which has accumulated in the ERBM to be transported back to the infeed module 70. The structure and operation of the second diverter 92 are conventional and well known and, therefore, will not be described.

The transport module 100 further includes a magnetic ink character recognition (MICR) head 72 for reading magnetic details on a code line of a check. The transport module 100 also includes an imager 74 including a front imaging camera 75 and a rear imaging camera 76 for capturing an image of each side of a check (front and rear). An endorser printer 78 is provided for printing endorsements onto checks. An image data memory 94 is provided for storing images of checks. A controller 95 is provided for controlling the operation of the elements within the CPM 60.

The pocket module 80 includes a main storage bin 84 for storing processed checks. The pocket module 80 further includes a reject bin 86 for storing rejected checks. A divert gate 82 is provided for diverting checks to the reject bin 86. If the checks are not diverted to the reject bin 86, they will continue on to the main storage bin 84. The structure and operation of the pocket module 80 are conventional and well known and, therefore, will not be described.

It should be apparent that the CPM 60 of FIG. 2 is shown in a first configuration where a pocket module is located in a top portion of the CPM. Accordingly, components of the CPM 60 of FIG. 2 are configured in a first mode of operation to provide functionality of the Model CPM4 check processing module sold by NCR Corporation.

The CPM 60 may be of a type which processes a bunch of checks or only one check at a time. If a bunch of checks is being processed, each check of the bunch is separated at the infeed module 70 before it is individually processed. Each processed check is then re-assembled at the ERBM 90 to bunch the checks back together. This type of processing is sometimes referred to as "multiple-check processing". Since individual checks are being bunched back together, an escrow module (such as the ERBM 90 shown in FIG. 2) is needed. The ERBM 90 is manufactured and available from Glory Products, located in Himeji, Japan. The ERBM 90 allows a bunch of checks (i.e., more than one check) to be processed in a single transaction. If a bunch of checks has accumulated in the ERBM 90 and is unable to be processed further within the CPM 60, then the bunch of checks is transported via the sixth document track portion 106 back to the infeed module 70 to return the bunch of checks to the ATM customer.

However, if the CPM 60 is of the type which can process only a single check, then the ERBM 90 is not needed. Once a check is received for processing, the check must be deposited into a bin (i.e., either the storage bin 84 or the reject bin 86) before another check can be received for processing. This type of processing is sometimes referred to as "single-check processing".

Figure 3:
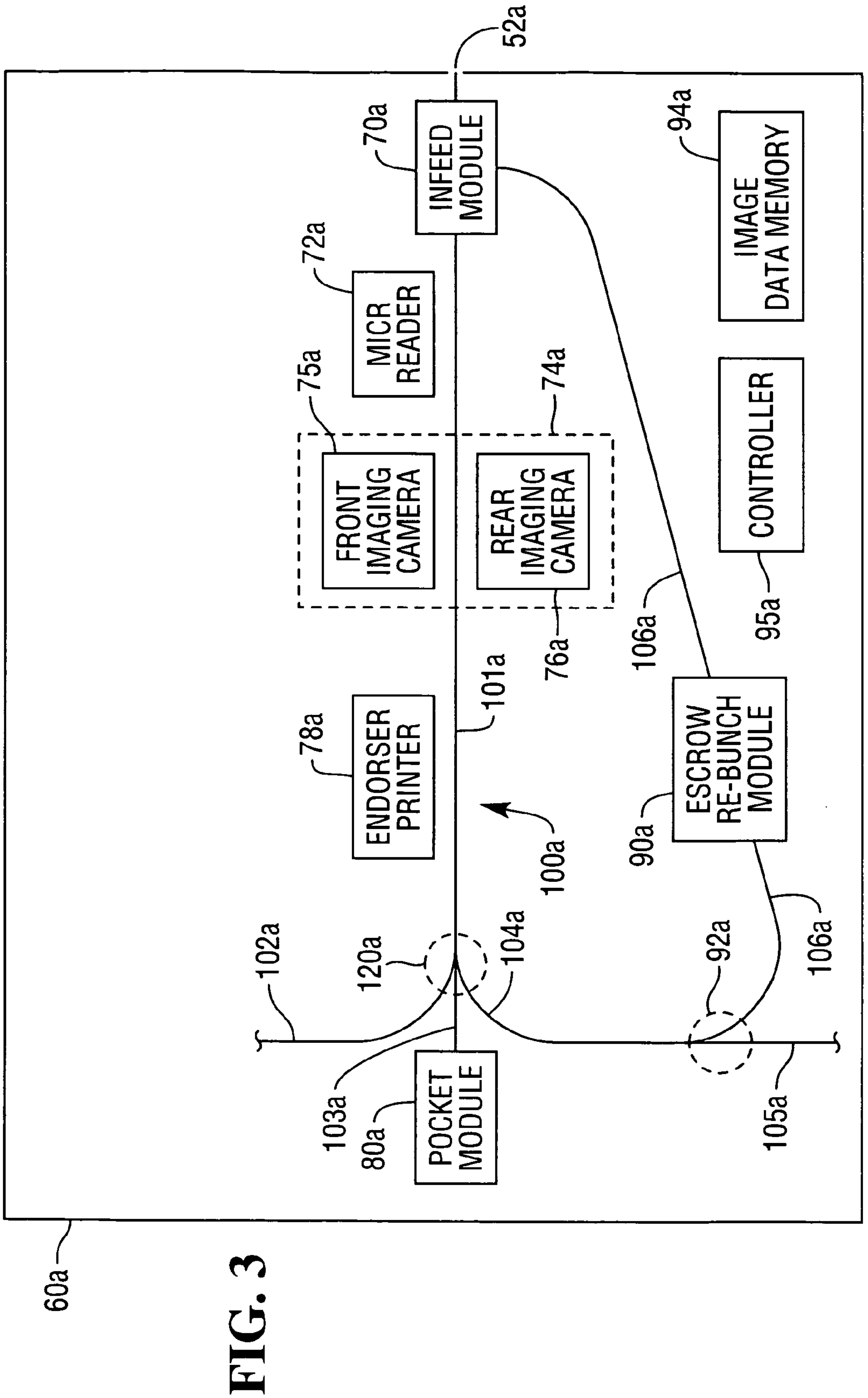
FIG. 3 is diagram similar to the diagram of FIG. 2, and illustrating the CPM configured to operate in another type of ATM.

Referring to FIG. 3, a second configuration of the CPM 60 of FIG. 2 is illustrated. Since the configuration illustrated in FIG. 3 is generally similar to the configuration illustrated in FIG. 2, similar numerals are utilized to designate similar components, the suffix letter "a" being associated with the configuration of FIG. 3 to avoid confusion.

The CPM 60*a* shown in FIG. 3 is in a configuration where the pocket module 80*a* is located in a rear portion of the CPM. Accordingly, components of the CPM 60*a* shown in FIG. 3 are configured in a second mode of operation to provide functionality of the Model CPM2 check processing module sold by NCR Corporation.

The CPM 60*a* shown in FIG. 3 comprises four main units which include the infeed module 70*a*, the pocket module 80*a*, the ERBM 90*a*, and the transport module 100*a*. The infeed module 70*a* receives a check which has been deposited into the check input/output slot 52*a*, and transports the check to an inlet of the transport module 100*a*. The dimensions of the infeed module 70*a*, such as its run length, may vary depending upon the particular model ATM the CPM 60 is installed. The structure and operation of the infeed module 70*a* are conventional and well known and, therefore, will not be described.

The transport module 100*a* includes a check input/output transport mechanism which receives a check from the inlet adjacent to the infeed module 70*a*, and transports the check along the first document track portion 101*a* which is the main track portion. The transport module 100*a* includes the first document diverter 120*a* which is operable to divert a check along the second document track portion 102*a* (not used in the configuration shown in FIG. 3), the third document track portion 103*a* to the pocket module 80*a*, or the fourth document track portion 104*a* which leads to the ERBM 90*a*.

The second document diverter 92*a* is operable to divert a check along the fifth document track portion 105*a* (not used in the configuration shown in FIG. 3), or the sixth document track portion 106*a* which leads to the ERBM 90*a* and then back to the infeed module 70*a*. More specifically, the sixth document track 106*a* interconnecting the ERBM 90*a* and the infeed module 70*a* allows a bunch of checks which has accumulated in the ERBM 90*a* to be transported from the ERBM back to the infeed module 70*a*. The structure and operation of the second diverter 92*a* are conventional and well known and, therefore, will not be described.

The transport module 100*a* further includes a magnetic ink character recognition (MICR) head 72*a* for reading magnetic details on a code line of a check. The transport module 100*a* also includes an imager 74*a* including a front imaging camera 75*a* and a rear imaging camera 76*a* for capturing an image of each side of a check (front and rear). An endorser printer 78*a* is provided for printing endorsements onto checks. An image data memory 94*a* is provided for storing images of checks. A controller 95*a* is provided for controlling the operation of the elements within the CPM 60*a*.

It should be apparent that the CPM 60*a* of FIG. 3 is shown in a second configuration where a pocket module (designated with reference numeral "80*a*" in FIG. 3) is located in a central portion of the CPM. Accordingly, components of the CPM 60*a* of FIG. 3 are configured in a second mode of operation to provide functionality of the Model CPM2 check processing module sold by NCR Corporation.

Figure 4:
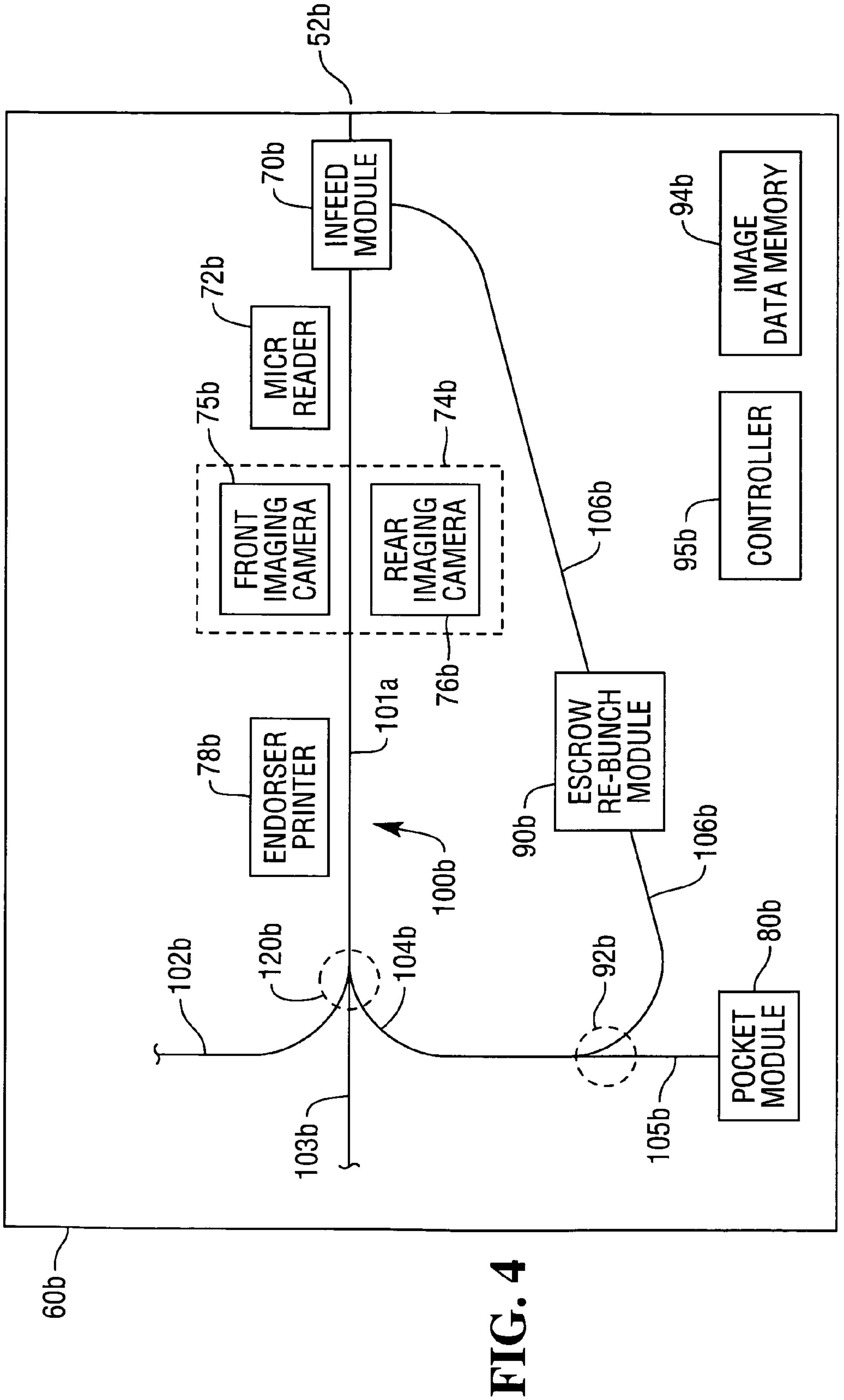
FIG. 4 is diagram similar to the diagrams of FIGS. 2 and 3, and illustrating the CPM configured to operate in yet another type of ATM.

Referring to FIG. 4, a third configuration of the CPM 60 of FIG. 2 is illustrated. Since the configuration illustrated in FIG. 4 is generally similar to the configuration illustrated in FIG. 2, similar numerals are utilized to designate similar components, the suffix letter "b" being associated with the configuration of FIG. 4 to avoid confusion.

The CPM 60*b* shown in FIG. 4 is in a configuration where the pocket module 80*b* is located in a bottom portion of the CPM. Accordingly, components of the CPM 60*b* shown in FIG. 4 are configured in a third mode of operation to provide functionality of the Model CPM3 check processing module sold by NCR Corporation The CPM 60*b* shown in FIG. 4 comprises four main units which include the infeed module 70*b*, the pocket module 80*b*, the ERBM 90*b*, and the transport module 10*b*. The infeed module 70*b* receives a check which has been deposited into the check input/output slot 52*b*, and transports the check to an inlet of the transport module 10*b*. The dimensions of the infeed module 70*b*, such as its run length, may vary depending upon the particular model ATM the CPM 60*b* is installed. The structure and operation of the infeed module 70*b* are conventional and well known and, therefore, will not be described.

The transport module 100*b* includes a check input/output transport mechanism which receives a check from the inlet adjacent to the infeed module 70*b*, and transports the check along the first document track portion 101*b* which is the main track portion. The transport module 100*b* includes the first document diverter 120*b* which is operable to divert a check along the second document track portion 102*b* (not used in the configuration shown in FIG. 4), the third document track portion 103*b* (also not used in the configuration shown in FIG. 4), or the fourth document track portion 104*b* which leads to either the pocket module 80*b* or the ERBM 90*b*.

More specifically, the second document diverter 92*b* is operable to divert a check along either the fifth document track portion 105*b* which leads to the pocket module 80*b* or the sixth document track portion 106*b* which leads to the ERBM 90*b* and then back to the infeed module 70*b*. The sixth document track 106*b* interconnecting the ERBM 90*b* and the infeed module 70*b* allows a bunch of checks which has accumulated in the ERBM 90*b* to be transported from the ERBM back to the infeed module 70*b*. The structure and operation of the second diverter 92*b* are conventional and well known and, therefore, will not be described.

The transport module 100*b* further includes a magnetic ink character recognition (MICR) head 72*b* for reading magnetic details on a code line of a check. The transport module 100*b* also includes an imager 74*b* including a front imaging camera 75*b* and a rear imaging camera 76*b* for capturing an image of each side of a check (front and rear). An endorser printer 78*b* is provided for printing endorsements onto checks. An image data memory 94*b* is provided for storing images of checks. A controller 95*b* is provided for controlling the operation of the elements within the CPM 60*b*.

It should be apparent that the CPM 60*b* of FIG. 4 is shown in a third configuration where a pocket module (designated with reference numeral "80*b*" in FIG. 4) is located in a lower or bottom portion of the CPM. Accordingly, components of the CPM 60*b* of FIG. 4 are configured in a third mode of operation to provide functionality of the Model CPM3 check processing module sold by NCR Corporation.

The structure and operation of the CPM in the three different modes of operation just described hereinabove are similar. A major difference in the different modes of operation is the specific location of the pocket module within the CPM. For simplicity, the detailed description hereinbelow will be from the vantage point of the first mode of operation of the CPM 60 of FIG. 2.

Figure 6:
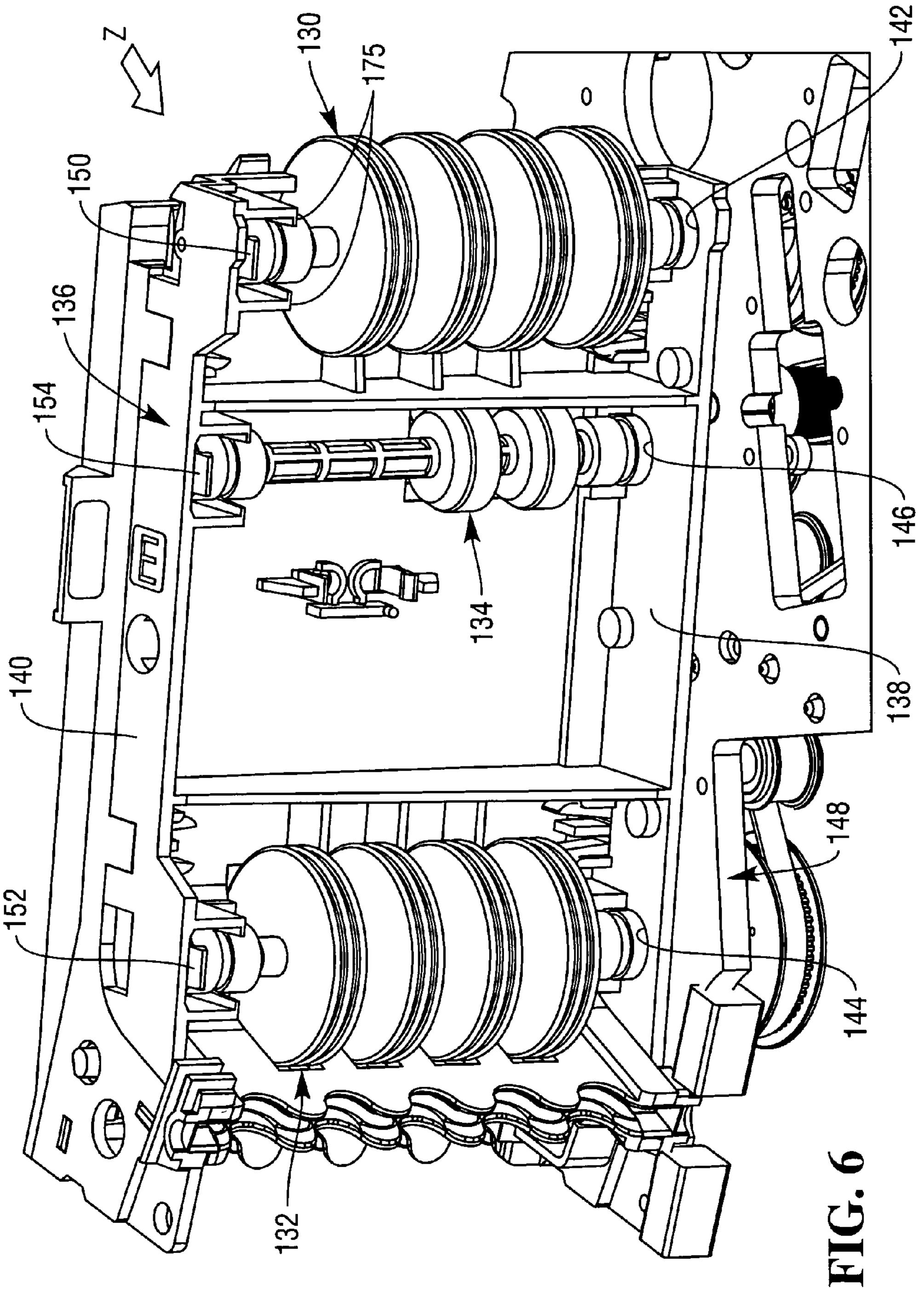
FIG. 6 is a perspective view, looking approximately in the direction of arrow Y shown in FIG. 5 with some parts removed.

Referring to FIG. 6, a perspective view, looking approximately in the direction of arrow Y shown in FIG. 5 with some parts removed, is illustrated. As shown in FIG. 6, three shaft assemblies 130, 132, 134 are secured to a substantially U-shaped plastic guide 136. The plastic guide 136 has first and second leg portions 138, 140 which form the substantially U-shape. The first leg portion 138 has surfaces which form three circular openings 142, 144, 146 through which the three shaft assemblies 130, 132, 134 extend. The first leg portion 138 is secured to a metal plate 148. The metal plate 148 has surfaces which form three openings (not shown) which align with the three circular openings 142, 144, 146 in the first leg portion 138 of the plastic guide 136.

The second leg portion 140 of the plastic guide 136 has three releasing members 150, 152, 154 in the form of manually-operable snap-on hook members. The releasing member 150 secures the shaft assembly 130 to the plastic guide 136. The releasing member 152 secures the shaft assembly 132 to the plastic guide 136. The releasing member 154 secures the shaft assembly 134 to the plastic guide 136.

Figure 8:
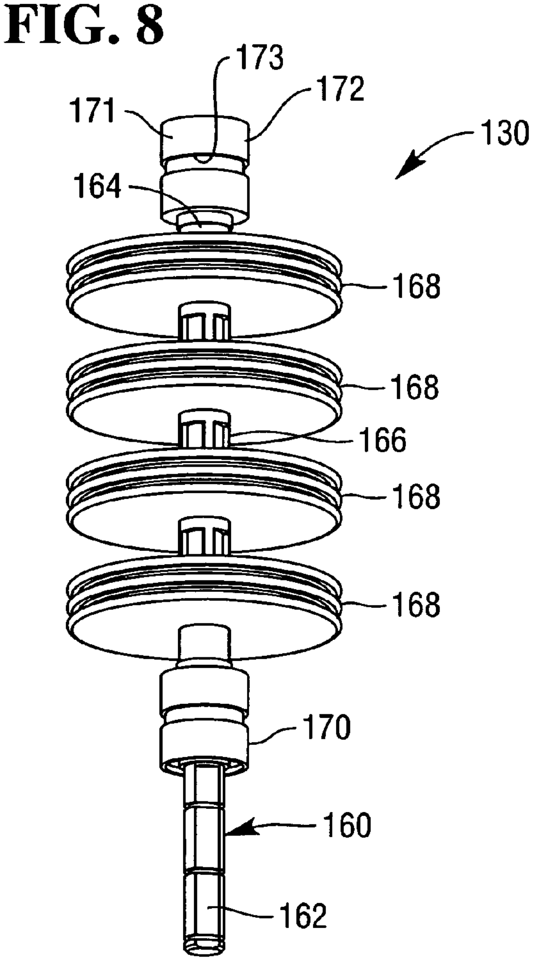
FIG. 8 is a perspective view of a shaft assembly shown in FIG. 6.
Figure 9:
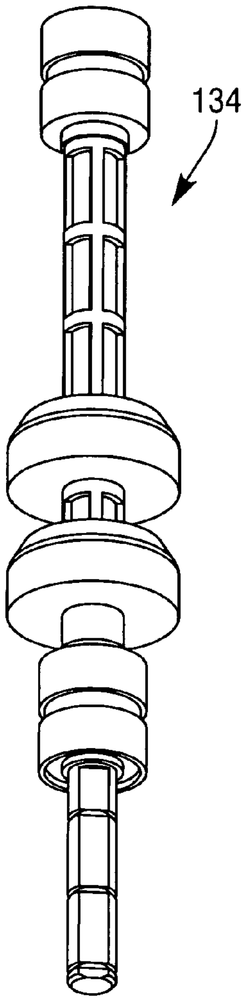
FIG. 9 is a perspective view of another shaft assembly shown in FIG. 6.

Referring to FIG. 8, a perspective view of the shaft assembly 130 shown in FIG. 6 is illustrated. The construction of the shaft assembly 132 shown in FIG. 6 is identical to the construction of the shaft assembly 130. The construction of the shaft assembly 134 shown in FIG. 6 (also shown larger view in FIG. 9) is similar to the construction to the shaft assembly 130. For simplicity, the structure of only the shaft assembly 130 will be described in detail hereinbelow.

As shown in FIG. 8, the shaft assembly 130 comprises a plastic shaft 160 having opposite end portions 162, 164 and a central portion 166 disposed between the opposite end portions. Four rubber drive rollers 168 are disposed on the central portion 166 of the plastic shaft 160. The drive rollers 168 are injection molded in place on the plastic shaft 160. Although four drive rollers are shown in FIG. 8, it is conceivable that any number of drive rollers be disposed on the central portion 166 of the plastic shaft 160. As an example, two drive rollers are used in the shaft assembly 134 shown in FIG. 6 (also shown in larger view in FIG. 9).

A first plastic race bearing 170 is attached to one end portion 162 of the plastic shaft 160 and is disposed in the opening 142 in the first leg portion 138 of the plastic guide 136 (FIG. 6). A second plastic race bearing 172 having an outer circumferential surface 171 is attached to the other end portion 164 of the plastic shaft 160 and is secured by the releasing member 150 to the second leg portion 140 of the plastic guide 136. More specifically, the second plastic race bearing 172 has an outer circumferential clip groove 173 (FIG. 8) into which a pair of flanges 175 (FIG. 6) of the plastic guide 136 extend. The pair of flanges 175 co-operate with the releasing member 150 to maintain the shaft assembly 130 in place as shown in FIG. 6.

The plastic shaft 160 comprises relatively stiff material, such as 60% glass filled nylon, to prevent deflection under load. The drive rollers 168 may be injection molded into place. Each of the first and second plastic race bearings 170, 172 may an inner race, an outer race, and two races of stainless steel balls for stability. The assembly of plastic shaft 160, the drive rollers 168, and the first and second plastic race bearings 170, 172 is available from BNL (UK) Ltd located in Knaresborough, United Kingdom.

The releasing member 152 is operable to secure the shaft assembly 130 to the plastic guide 136 during operation of the CPM. The releasing member 150 is also operable to allow release of the shaft assembly 130 from the plastic guide 136 during disassembly of parts of the CPM whenever disassembly is needed. Structure and operation of the releasing member 150 will be described in more detail later.

Figure 7:
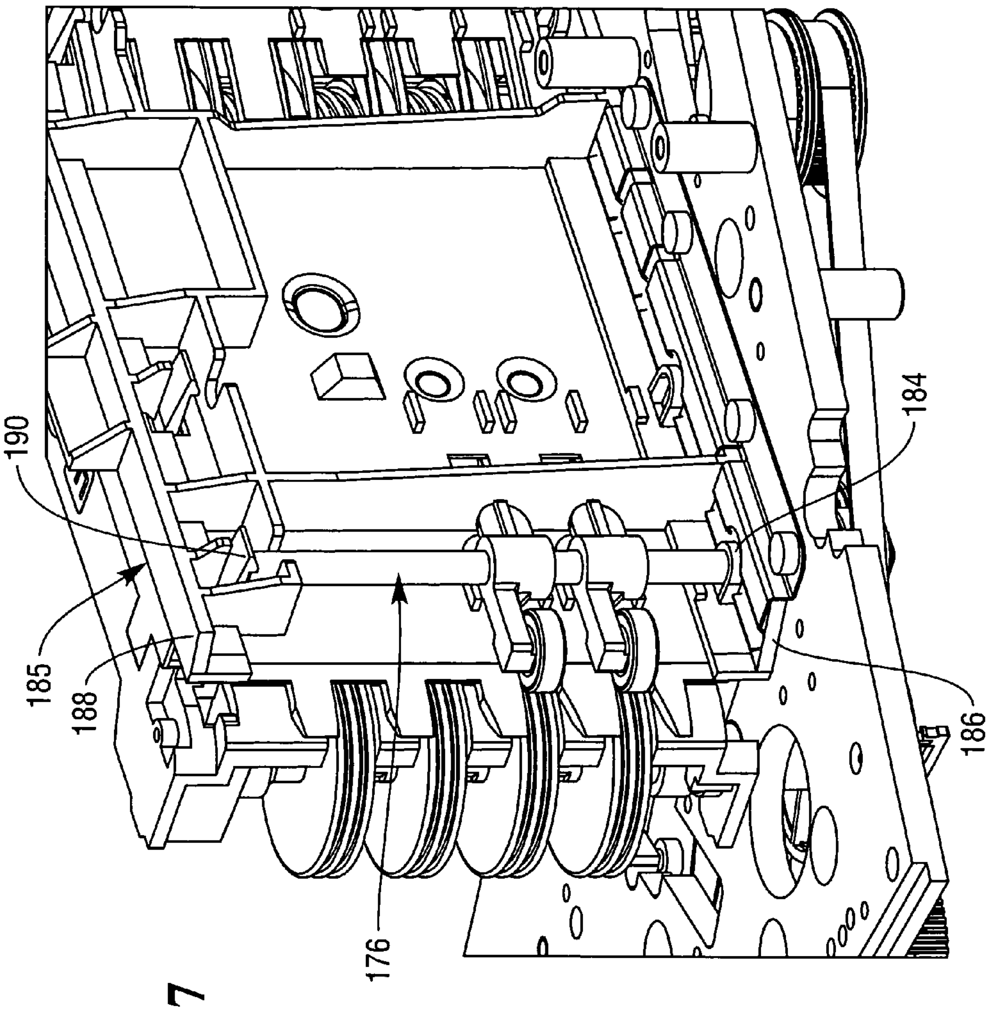
FIG. 7 is an perspective view, looking approximately in the direction of arrow Z shown in FIG. 6.
Figure 10:
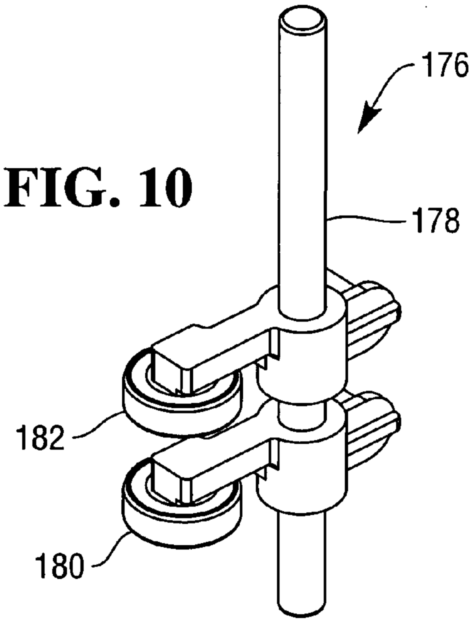
FIG. 10 is a perspective view of a shaft assembly shown in FIG. 7.

Referring to FIG. 7, a perspective view, looking approximately in the direction of arrow Z shown in FIG. 6, is illustrated. As shown in FIG. 7, an idler shaft assembly 176 is illustrated (also shown in larger view in FIG. 10). As shown in FIG. 10, the idler shaft assembly 176 includes a shaft 178 to which a pair of idler roller assemblies 180, 182 are mounted. The idler roller assemblies 180, 182 and the mounting of the assemblies onto the shaft 178 are conventional and known.

As shown in FIG. 7, one end of the shaft 178 is supported in a U-shaped mounting region 184 in a first leg portion 186 of a substantially U-shaped plastic guide 185. A releasing member 190 secures the other end of the shaft 178 to a second leg portion 188 of the plastic guide 185. The releasing member 190 shown in FIG. 7 has the same general construction and operation as the three releasing members 150, 152, 154 shown in FIG. 6. For simplicity, the construction and operation of only the releasing member 150 associated with the shaft assembly 130 shown in FIG. 6 will be described hereinbelow.

Figure 11:
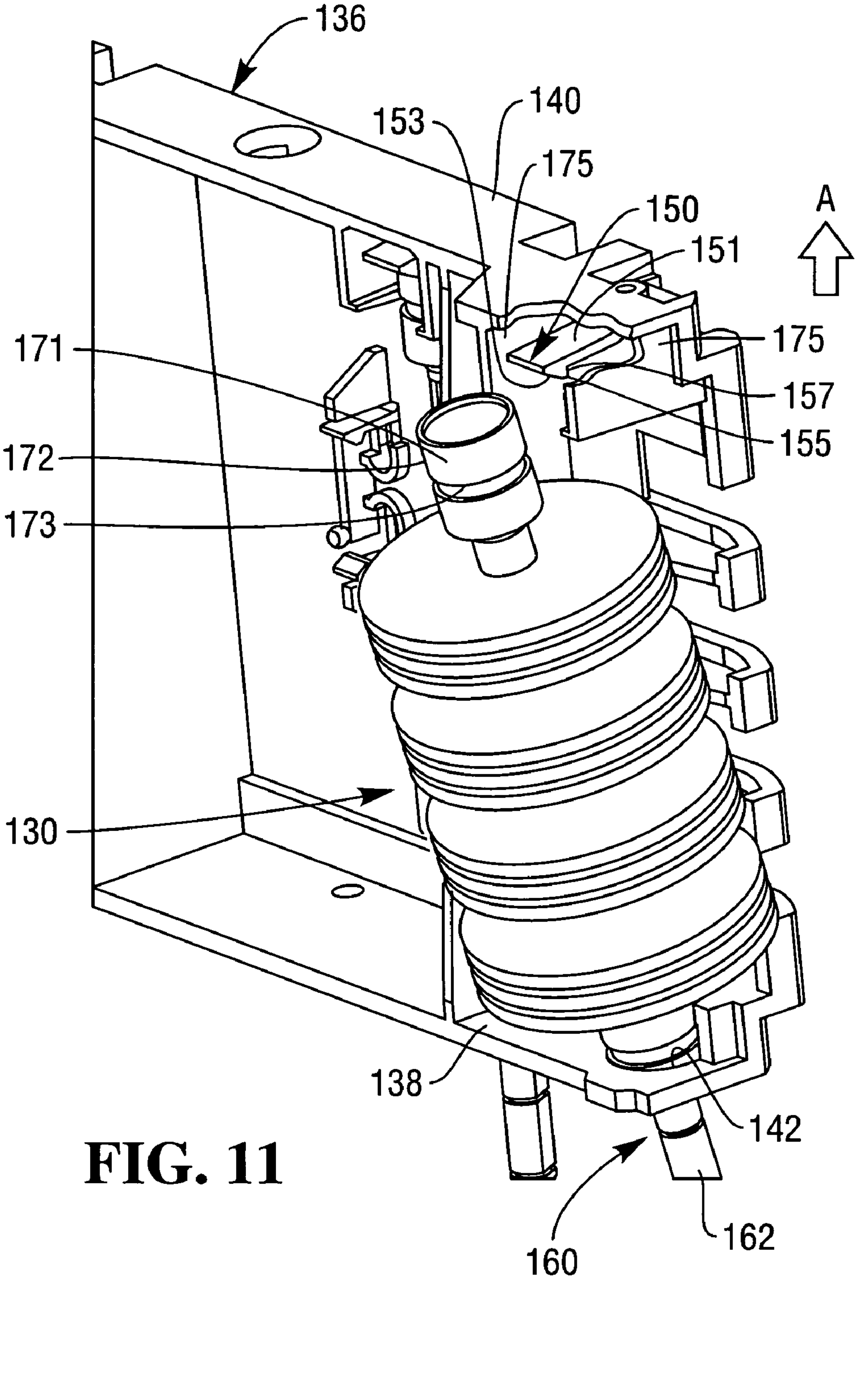
FIG. 11 is a perspective view of the shaft assembly of FIG. 8 being assembled.

Referring to FIG. 11, a perspective view of the shaft assembly 130 of FIG. 8 being assembled from an initial position (FIG. 11) into the installed position (FIG. 6) is illustrated. As shown in FIG. 11, a portion of one of the flanges 175 and a portion of the second leg portion 140 of the plastic guide 136 are shown removed to better illustrate the detailed structure of the releasing member 150. The releasing member 150 comprises a tab portion 151 in which one end (not shown) is integrated into the plastic guide 136 to form a single piece of material. An angled surface portion 153 extends from the other end of the tab portion 151 to form a tip portion 155. A transverse surface portion 157 extends between the tip portion 155 and the tab portion 151. The tab portion 151 is flexible and can be manually lifted in the direction of arrow A shown in FIG. 11.

When the shaft assembly 130 is being installed from the initial position shown in FIG. 11 to the installed position shown in FIG. 6, the end portion 162 of the plastic shaft 160 is first placed through the opening 142 in the first leg portion 138 of the plastic guide 136. The clip groove 173 of the second plastic race bearing 172 is then aligned with the pair of flanges 175 and moved from the initial position shown in FIG. 11 to the installed position shown in FIG. 6. When this occurs, one side of the outer circumferential surface 171 engages the angled surface portion 153 of the releasing member 150 and flexes the tab portion 151 in direction of arrow A and upward (as viewed looking at FIG. 11). Eventually the tip portion 155 of the releasing member 150 clears the opposite side of the outer circumferential surface 171 and snaps in a downward direction (as viewed looking at FIG. 11) so that the transverse surface portion 157 engages the outer circumferential surface 171.

After the tip portion 155 snaps in the downward direction, the shaft assembly 130 is secured in place relative to the plastic guide 136. More specifically, the flanges 175 in the groove 173 act to prevent movement of the shaft assembly 130 along the longitudinal axis of the plastic shaft 160. The flanges 175 in the groove 173 also act to prevent movement of the shaft assembly 130 in a first direction which is transverse to the longitudinal axis of the plastic shaft. Moreover, the engagement between the transverse surface portion 157 of the releasing member 150 and the outer circumferential surface 171 of the second plastic race bearing 172 acts to prevent movement of the shaft assembly 130 in a second direction which is transverse to the first direction and also to the longitudinal axis of the plastic shaft 160. Accordingly, the releasing member 150 functions as a snap-on hook to prevent movement of the shaft assembly 130 relative to the plastic guide 136 after the shaft assembly has been installed in the installed position shown in FIG. 6.

It should be apparent that assembly of the CPM should be relatively rapid since most parts snap together and no fasteners are used. Also, final assembly should also be relatively rapid since major parts can be pre-assembled as sub-assemblies. Moreover, parts should be relatively easier to replace since the parts are not buried in large final assemblies.

It should also be apparent that manufacturing costs should be relatively lower since many components are made from injection molded plastics, and thus eliminating many relatively expensive sheet metal parts and machined parts. Further, since plastic race steel ball technology is greaseless, the CPM can be driven with only a single stepper motor (instead of with dual stepper motors in known CPMs). Accordingly, parts costs as well as manufacturing costs are reduced.

Although the above description describes the PERSONAS (trademark) 6676 NCR ATM embodying the present invention, it is conceivable that other models of ATMs, other types of ATMs, or other types of self-service check depositing terminals may embody the present invention. Self-service depositing terminals are generally public-access devices that are designed to allow a user to conduct a check deposit transaction in an unassisted manner and/or in an unattended environment. Self-service check depositing terminals typically include some form of tamper resistance so that they are inherently resilient.

Further, although the above description describes the CPM 60, 60*a*, 60*b* which has the ERBM 90, 90*a*, 90*b*, it is conceivable that the present invention may be embodied in a CPM which does not have an ERBM.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A check processing module (CPM) for a self-service check depositing terminal, the CPM comprising:

a substantially U-shaped plastic guide including (i) first and second leg portions forming the substantially U-shape, (ii) a surface which forms an opening in the first leg portion, (ii) a pair of flange extensions which are disposed on the second leg portion, and (iii) a releasing member which is disposed substantially between the pair of flange extensions on the second leg portion; and a shaft assembly including (i) a plastic shaft having opposite end portions and a central portion between the opposite end portions, (ii) a number of drive rollers disposed on the central portion, (iii) a first plastic race bearing attached to one end portion of the plastic shaft and disposed in the opening of the plastic guide, and (iv) a second plastic race bearing attached to the other end portion of the plastic shaft and secured by the releasing member to the plastic guide, wherein the second plastic race bearing has an outer circumferential surface in which an outer circumferential groove is formed to provide a clearance for the pair of flange extensions of the plastic guide to project into and thereby to prevent at least some movement of the shaft assembly relative to the plastic guide when the second plastic race bearing is secured to the plastic guide;

the releasing member being operable to secure the shaft assembly to the plastic guide during operation of the CPM, and being operable to release the shaft assembly from the plastic guide during disassembly of parts of the CPM.

2. A CPM according to claim 1, wherein the releasing member comprises a manually-releasable hook member which is (i) biased in a first direction to secure the shaft assembly to the plastic guide during operation of the CPM, and (ii) when manually released in a second direction which is opposite the first direction, allows the shaft assembly to be released from the plastic guide during disassembly of parts of the CPM.

3. A CPM according to claim 2, wherein the hook member includes a transverse surface portion which contacts the outer circumferential surface of the second plastic race bearing to prevent at least some movement of the shaft assembly relative to the plastic guide when the hook member is biased in the first direction.

4. A CPM according to claim 3, wherein the hook member is integrated into the second leg portion of the plastic guide to form a single piece of material.

5. A CPM according to claim 1, wherein (i) the opening in the first leg portion of the substantially U-shaped plastic guide is circular, (ii) the first plastic race bearing is supported in the circular opening by the first leg portion of the plastic guide, and (iii) construction of the first plastic race bearing and construction of the second plastic race bearing are substantially identical.

6. A check processing module (CPM) for a self-service check depositing terminal, the CPM comprising:

a plate;

a plastic guide attached to the plate and including (i) a surface which forms an opening, and (ii) a snap-on hook member which faces the opening; and a shaft assembly including (i) a plastic shaft having opposite end portions and a central portion between the opposite end portions, (ii) a number of drive rollers disposed on the central portion of the plastic shaft, (iii) a first plastic race bearing attached to one end portion of the plastic shaft and disposed in the opening of the plastic guide, and (iv) a second plastic race bearing attached to the other end portion of the plastic shaft and secured by the snap-on hook member to the plastic guide, wherein construction of the first plastic race bearing and construction of the second plastic race bearing are substantially identical;

the snap-on hook member being biased in a first direction to secure the shaft assembly to the plastic guide during operation of the CPM, and being manually movable in a second direction which is opposite the first direction to allow the shaft assembly to be released from the plastic guide during disassembly of parts of the CPM.

7. A CPM according to claim 6, wherein (i) the plastic guide includes a pair of flange extensions, (ii) the snap-on hook member is disposed substantially between the pair of flange extensions, (iii) the second plastic race bearing has an outer circumferential surface in which an outer circumferential groove is formed to provide a clearance for the pair of flange extensions of the plastic guide to project into and thereby to prevent at least some movement of the shaft assembly relative to the plastic guide when the second plastic race bearing is secured to the plastic guide, and (iv) the hook member includes a transverse surface portion which contacts the outer circumferential surface of the second plastic race bearing to prevent at least some movement of the shaft assembly relative to the plastic guide when the hook member is biased in the first direction.

8. A CPM according to claim 7, wherein the hook member is integrated into the plastic guide to form a single piece of material.

9. A CPM according to claim 6, wherein the opening in the plastic guide is circular.

10. A CPM according to claim 6, wherein the plate comprises metal material.

11. A check processing module (CPM) for a self-service check depositing terminal, the CPM comprising:

a metal plate having an opening;

a substantially U-shaped plastic guide attached to the metal plate and including (i) first and second leg portions forming the substantially U-shape, (ii) a pair of flange extensions which are disposed on the second leg portion, (iii) a surface which forms a circular opening which is disposed in the first leg portion and which aligns with the opening in the metal plate, and (iii) a snap-on hook member which is disposed substantially between the pair of flange extensions on the second leg portion and which faces the circular opening disposed in the first leg portion; and a shaft assembly including (i) a plastic shaft having opposite end portions and a central portion between the opposite end portions, (ii) a number of drive rollers disposed on the central portion of the plastic shaft, (iii) a first plastic race bearing attached to one end portion of the plastic shaft and disposed in the circular opening of the substantially U-shaped plastic guide, and (iv) a second plastic race bearing attached to the other end portion of the plastic shaft and secured by the snap-on hook member to the substantially U-shaped plastic guide, wherein construction of the first plastic race bearing and construction of the second plastic race bearing are substantially identical and the second plastic race bearing has an outer circumferential surface in which an outer circumferential groove is formed to provide a clearance for the pair of flange extensions to project into and thereby to prevent at least some movement of the shaft assembly relative to the plastic guide when the second plastic race bearing is secured to the plastic guide;

the snap-on hook member being biased in a first direction to secure the shaft assembly to the substantially U-shaped plastic guide during operation of the CPM, and being manually movable in a second direction which is opposite the first direction to allow the shaft assembly to be released from the substantially U-shaped plastic guide during disassembly of parts of the CPM, wherein the snap-on hook member includes a transverse surface portion which contacts the outer circumferential surface of the second plastic race bearing to prevent at least some movement of the shaft assembly relative to the plastic guide when the snap-on hook member is biased in the first direction.

12. A CPM according to claim 11, wherein the hook member is integrated into the substantially U-shaped plastic guide to form a single piece of material.

* * * * *